Patented Jan. 19, 1937

2,068,294

UNITED STATES PATENT OFFICE 2,068,294

INORGANIC COLORED PIGMENT AND A PROCESS OF PREPARING THE SAME

Erich Korinth, Frankfort-on-the-Main-Hochst, and Georg Meder, Munster in Taunus, Germany, assignors to I. G. Farbenindustrie Aktiengesellschaft, Frankfort-on-the-Main, Germany No Drawing. Application February 3, 1932, Serial No. 590,774. In Germany February 7, 1931

8 Claims. (Cl. 134—58)

Our present invention relates to new inorganic colored pigments and to a process of preparing the same, more particularly it relates to pigments comprising mixed crystals containing in their lattice construction zinc oxide, at least one oxide of a metal of the fourth group of the periodic system consisting of Si, Zr, Sn, and Ti, and at least one coloring oxide of a metal of the group consisting of V, Cr, Mn, Fe, Co, Ni, Cu, and U.

Most of the suggestions hitherto made for the production of artificial mineral colors are directed to improvements or modifications in the manufacture of the known colored metal oxides commonly used as inorganic pigments. Only a few attempts have been made to prepare new mineral coloring matters by using different starting materials, and but few experiments relating to systematic methods of building up inorganic coloring matters have become known.

As is known, in organic dyestuffs the elements which give rise to the property of color are chiefly the so-called chromophoric groups, i. e., certain atomic groupings which, when introduced into colorless hydrocarbon radicals, are capable of imparting color or coloring power to the said organic compounds. In inorganic chemistry the coloring property is associated rather with properties of the atom; like the atomic volume the color is, in a similar manner, a periodic function of the ordinal number. Atomic groupings which may be called "chromophores" in inorganic chemistry contain, therefore, elements having small atomic volumes. Such elements are enumerated by Ostwald "Farbkunde", 1923, page 217 et seq. as "strongly coloring" elements. Wherever the term "strongly coloring elements" appears in the following disclosure and in the appended claims it is understood to include the said elements enumerated by Ostwald.

We have now found that by thermal combination of at least two suitable metal oxides, such as the oxides of the element Zn on the one hand and the elements of the fourth group of the periodic system, such as Ti, Si, Sn or Zr, on the other hand there are obtained colorless or weakly colored and partly salt-like fundamental compounds which we call the "pigment basis" and which per se already possess good pigment properties and are excellent starting materials for building up colored pigments.

By further thermal combination of these fundamental substances with one or more of the oxides of the "strongly coloring elements", one or the other of the components of the fundamental substance is wholly or partly replaced by one or more of the strongly coloring elements. Thus we obtain new colored pigments which, according to the nature and proportions of the fundamental compounds and the oxides of the strongly coloring elements used, show a great variety of shades. According to the degree of oxidation of the coloring elements used, further variations as to the properties and shades of the pigments are possible. Particularly useful and suitable for the purpose of the present invention are the oxides of the strongly coloring elements V, Cr, Mn, Fe, Co, Ni, Cu, U.

In order to obtain a fixed or precise degree of oxidation of the oxides present in the pigments, it is suitable to heat the products in a gaseous atmosphere having a predetermined oxidation or reduction potential.

The intensity and shade of color and the purity of the pigments obtained depends in a large degree on the percentage of the several components present in the pigments and may, under certain circumstances, be influenced by changing the relative proportions of the several components.

If, for instance, colored pigments are prepared from the three metal oxides $TiO_2$, $Cr_2O_3$, and ZnO, and if the triangle coordinate system is used as a graphic illustration of the percentages in which the components are present in the compositions, there result a great number of olive-green, yellow-green and leaf-green shades. Pigments whose compositions are situated on the connecting line between the angles $Cr_2O_3$ and ZnO are gray, but it is surprising that small quantities of $TiO_2$ are capable of reducing the black value and developing the latent coloring properties of $Cr_2O_3$. If, according to this method, the composition of a pigment of a desired shade has been determined, it is easily possible to reproduce this pigment, and it is immaterial in what order the several components are combined and whether the production of the pigment is carried out in a single operation or in several steps.

The thermal combination of the oxides may particularly advantageously be carried out by using as starting materials instead of the oxides themselves, suitable metal compounds capable of forming the corresponding oxides by thermal dissociation. The metal oxides are thus formed by thermal dissociation during the formation of the pigments. We have found that metal sulfates are particularly suitable due to their high decomposition point.

The time of reaction and the temperature necessary for the formation of the pigments may be reduced by adding in known manner fluxes or mineralizers, for instance, KCl, $Na_2SO_4$, etc. The reaction between the components is generally carried out at temperatures between about 800 and about 1100° C. Higher temperatures may be used but are not necessary if the substances are heated to the said temperatures for a sufficiently long time.

The following examples serve to illustrate our invention but it is to be understood that the invention is not limited thereto nor to the particular substances, the number of the components and to the respective proportions given in the examples. We wish it to be understood that the temperatures and the data relating to the time of the reactions given in the several examples are only approximate and may, of course, also be varied. The parts are by weight.

(1) An intimate mixture of 20 parts of $ZnSO_4.7H_2O$ and 8 parts of $TiO_2$ is heated for 1 hour at about 1000° C. in order to expel sulfuric acid anhydride. The thus obtained white fundamental substance is well mixed with 8.5 parts of $NiSO_4.7H_2O$ and heated again. There is obtained a very stable pigment having a shining light-green color and about the following composition: $(Zn_2,Ni).(TiO_3)$.

By using instead of 20 parts, 49 parts of zinc sulfate, there is obtained a yellow-green pigment of the composition $(Zn_{1.7}.Ni_{0.3})TiO_4$.

(2) By heating a mixture of 20 parts of $FeSO_4.7H_2O$, 8 parts of $TiO_2$ and 20 parts of $ZnSO_4.7H_2O$ for about 1 hour at about 800° C. to about 1000° C. and subjecting the product obtained which is free from sulfuric acid anhydride to reduction at about 800° C. to about 1000° C. so that $Fe_2O_3$ is converted into FeO, there is obtained a bluish-black pigment of good fastness and good covering power.

(3) 70 parts of $ZnSO_4.7H_2O$, 15 parts of $TiO_2$ and 15 parts of $Cr_2(SO_4)_3$ yield on being heated to 1000° C.–1100° C. a beautiful leaf-green pigment.

(4)

| | Parts |
|---|---|
| $ZnSO_4.7H_2O$ | 28.7 |
| $CoSO_4.7H_2O$ | 28.1 |
| $SiO_2$ | 12.0 | yield on being heated for 2 hours to about 1000° C. a beautiful blue pigment.

We claim:

1. A pigment comprising mixed crystals containing in their lattice construction zinc oxide, at least one oxide of a metal of the fourth group of the periodic system consisting of Si, Zr, Sn, and Ti, and at least one coloring oxide of a metal of the group consisting of V, Cr, Mn, Fe, Co, Ni, Cu, and U.

2. A pigment comprising mixed crystals containing in their lattice construction zinc oxide, titanium oxide and nickel oxide.

3. A pigment comprising mixed crystals containing in their lattice construction zinc oxide, silicon dioxide and cobalt oxide.

4. A pigment comprising mixed crystals containing in their lattice construction zinc oxide, titanium oxide and iron oxide.

5. The process of producing pigments which comprises combining, at a temperature between about 800° C. and about 1100° C., zinc oxide, at least one oxide of a metal of the fourth group of the periodic system consisting of Si, Zr, Sn, and Ti, and at least one coloring oxide of a metal of the group consisting of V, Cr, Mn, Fe, Co, Ni, Cu, and U.

6. The process of producing pigments which comprises combining, at a temperature between about 800° C. and about 1100° C., zinc oxide, titanium oxide, and nickel oxide.

7. The process of producing pigments which comprises combining, at a temperature between about 800° and about 1100° C., zinc oxide, silicon dioxide and cobalt oxide.

8. The process of producing pigments which comprises combining, at a temperature between about 800° C. and about 1100° C., zinc oxide, titanium oxide, and iron oxide.

ERICH KORINTH.
GEORG MEDER.